Oct. 18, 1932.  W. E. GOBLE  1,883,694
BRUSH PICKING AND MACERATING MACHINE
Filed May 26, 1931  4 Sheets-Sheet 1
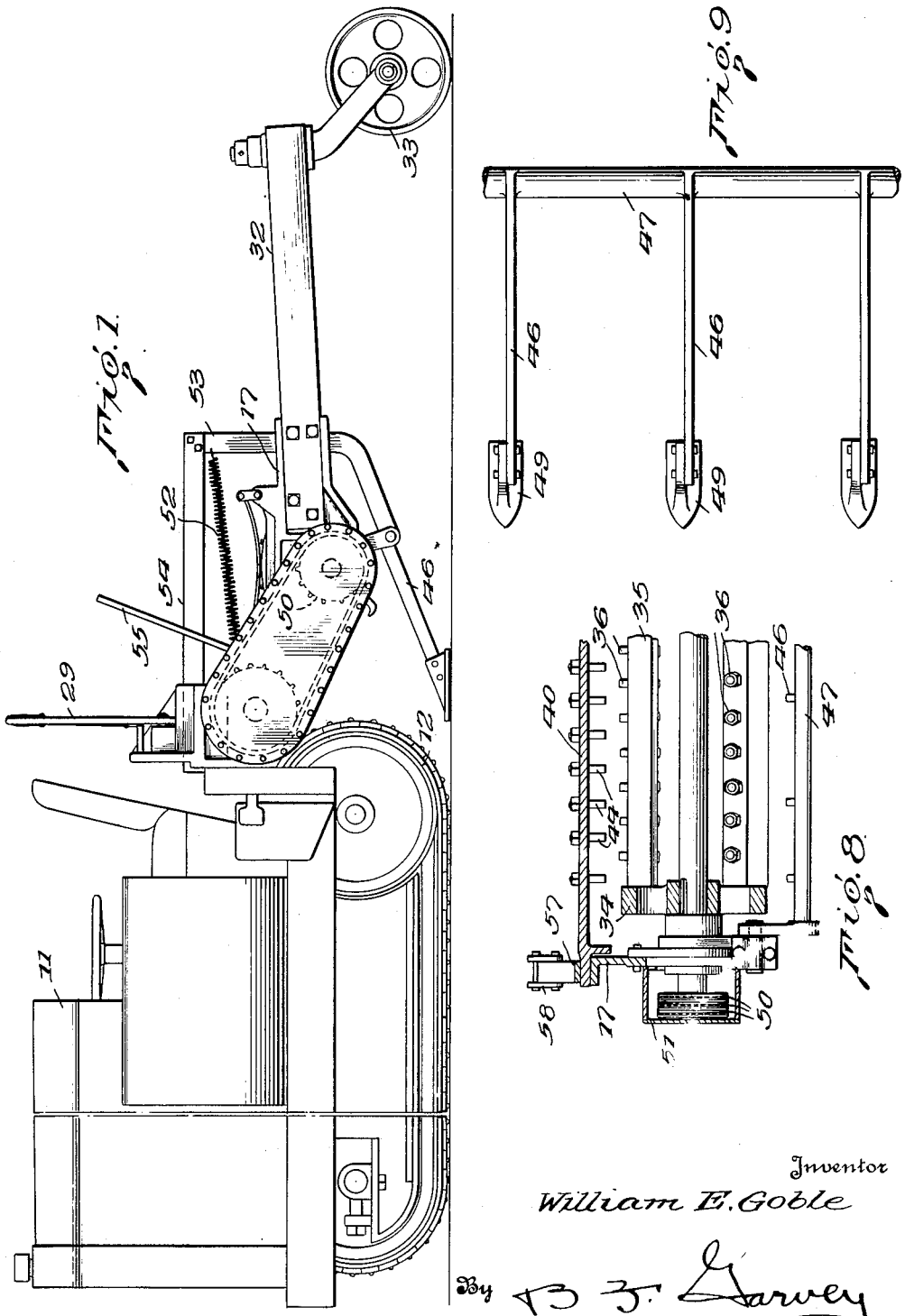
Inventor
William E. Goble
By B. J. Garvey
Attorney

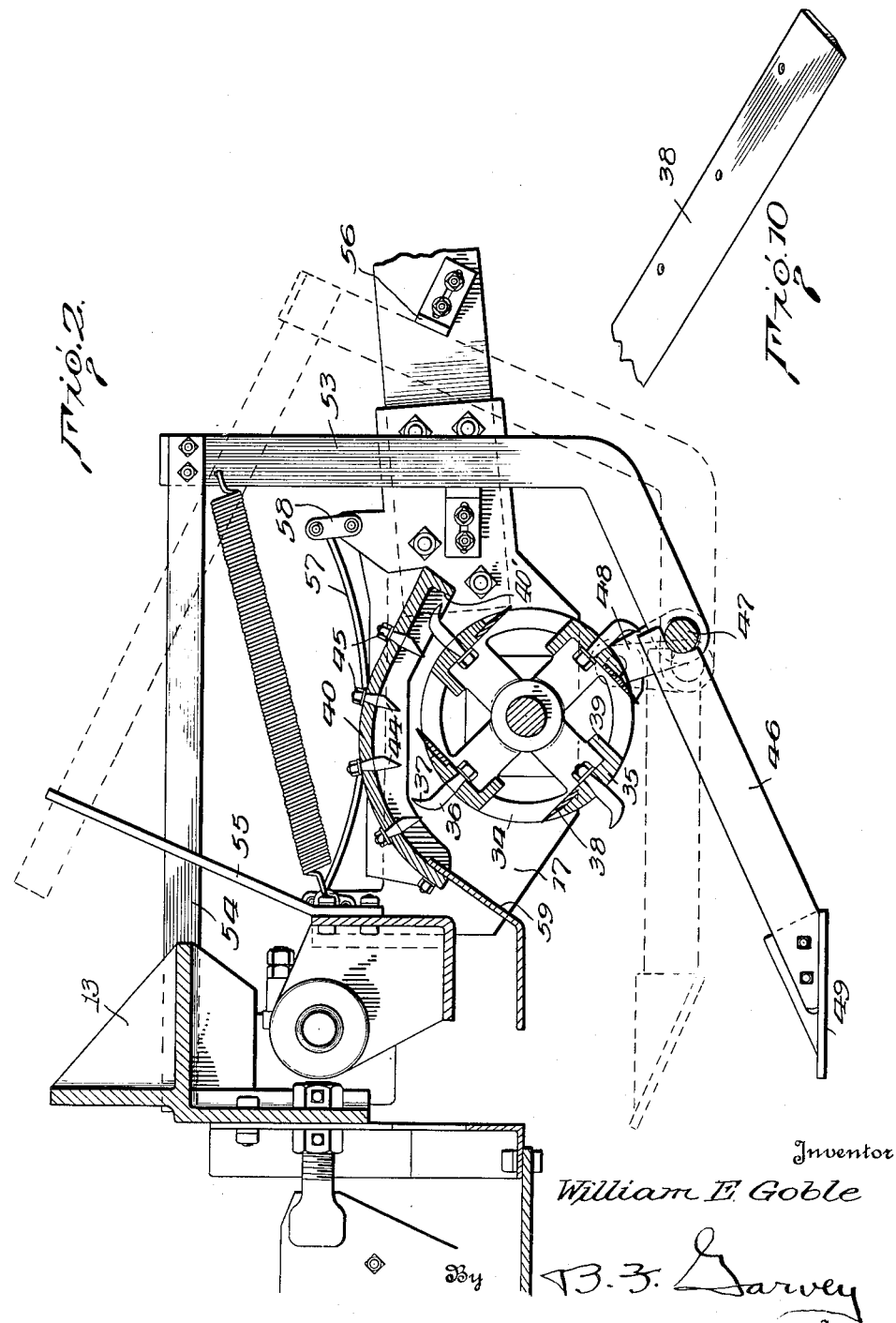

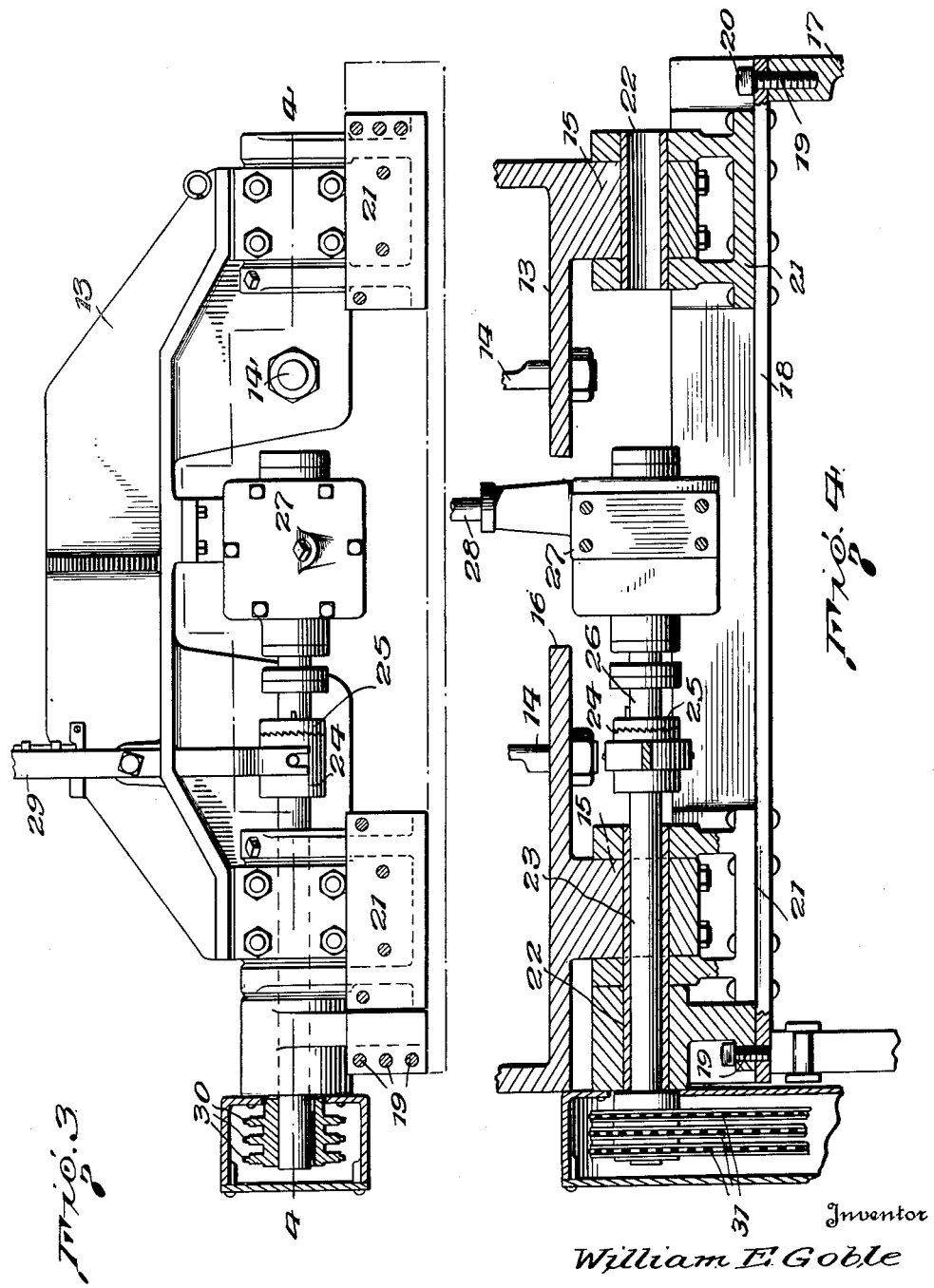

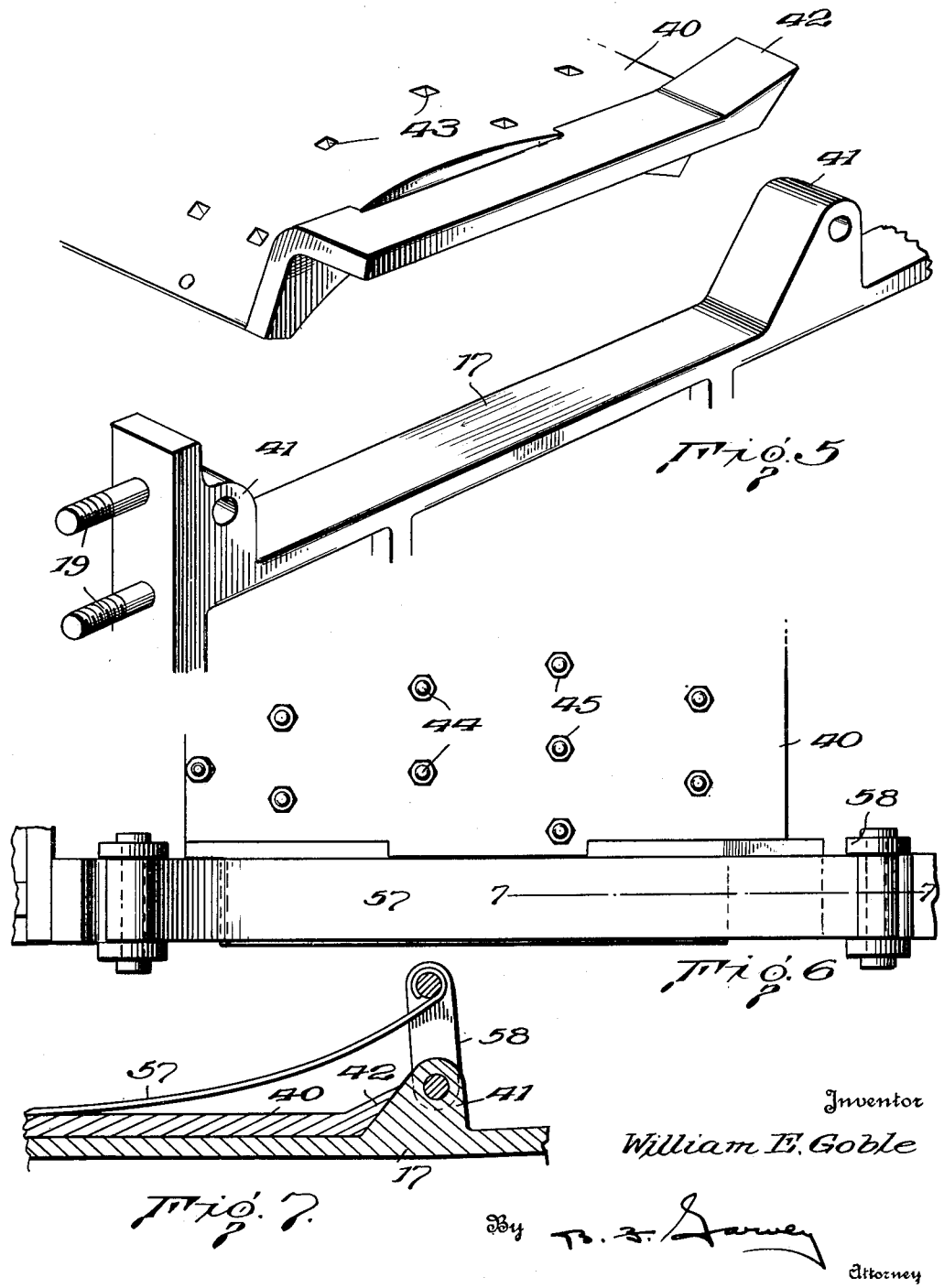

Patented Oct. 18, 1932

1,883,694

UNITED STATES PATENT OFFICE

WILLIAM E. GOBLE, OF OROSI, CALIFORNIA, ASSIGNOR TO S. P. KEITHLY, OF FRESNO, CALIFORNIA

BRUSH PICKING AND MACERATING MACHINE

Application filed May 26, 1931. Serial No. 540,127.

The present invention consists of a brush picking and macerating machine and is designed as an improvement over my United States Patent No. 1,648,341, granted November 8th, 1927.

The principal object of the present invention is to provide a brush picking and macerating means adapted for engagement with a tractor, the picking and macerating means being articulate to avoid breakage or distortion of the means in passing over uneven surfaces in the road of travel.

Another object of the invention is to combine a brush picking and macerating mechanism with a tractor in such manner that traversing of the land between rows of trees, bushes, vines, etc., is permitted to primarily depress the brush or prunings on the ground between the rows, after which the brush is picked up and forced into a macerating mechanism from which mechanism the macerated residue is ejected and spread upon the land.

A further object of the invention is to provide picker arms with separate fingers which ride over the ground, in parallelism to the latter, to positively dislodge the brush from the road of travel without danger of distorting or mutilating the picker arms.

A still further object of the invention resides in the provision of macerating means which includes a yieldable part which will flex under pressure to permit solid objects, such as pipes, stones, or the like, to pass through the macerator without damaging the latter.

Other objects of the invention will be apparent from the following description of the present preferred form of the invention, taken in connection with the accompanying drawings, wherein Fig. 1 is a side elevational view of a track-laying tractor, illustrating the application of a brush picking and macerating means constructed in accordance with the present invention, applied thereto;

Fig. 2 is a detail, enlarged, fragmentary sectional view taken through the picking and macerating means, showing to advantage the relative positions of the picking arms of the macerating drum and macerating housing;

Fig. 3 is a transverse sectional view taken at the juncture of the tractor and picking and macerating mechanism, showing to advantage the means used for hingedly connecting the picker and macerator with the tractor and likewise the transmission mechanism and clutch employed for transmitting power from the tractor to the brush picker and macerator;

Fig. 4 is a transverse sectional view taken on the line 4—4 of Fig. 3;

Fig. 5 is a detail fragmentary perspective view of one of the side sills and macerating housing, showing the latter removed from the sill;

Fig. 6 is a detail fragmentary view in top plan of the macerating housing and sill, showing to advantage the spring means used for yieldingly engaging the housing with the sill;

Fig. 7 is a detail, enlarged, fragmentary longitudinal sectional view taken on the line 7—7 of Fig. 6 and shows to advantage the manner of connecting the semi-elliptical spring and shackle to the side sill;

Fig. 8 is a detail fragmentary sectional view, taken through the macerating drum and housing;

Fig. 9 is a detail fragmentary plan view of the picker arm shaft, illustrating the manner of connecting the picker arms thereto; and Fig. 10 is a detail fragmentary perspective view of one of the macerating knives.

In the drawings, a conventional form of track-laying tractor is illustrated, as indicated at 11, and includes the usual endless cleated belt, or belts, 12, which in the present instance, are adapted to operate in advance of the mechanism constructed in accordance with the present invention, hereinafter described, to primarily level brush or vegetation prunings. In this way the brush or prunings are urged into close proximity to the ground to be picked up and macerated in a manner hereinafter described.

For the purpose of attaching the picker and macerator, constructed in accordance with this invention, to the tractor, I preferably employ a frame 13, which is bolted, as indicated at 14, or otherwise secured to the tractor, and is equipped with bearings 15, projecting outwardly from the face of the frame, near the ends of the latter. The frame is intermediately open, as indicated at 16, to permit the passage of a power shaft therethrough, through the medium of which power is transmitted from the tractor to the picker and macerator, in a manner more fully hereinafter set forth.

The picker and macerator constructed in accordance with the present invention embodies a supporting frame, which includes a pair of side sills 17, the forward ends of which are detachably engaged by a plate 18. Preferably the side sills 17 carry bolts 19, which extend through the plate 18. The free ends of the bolts are adapted to receive nuts 20 to prevent displacement of the sills from the plate 18. The plate 18 carries a pair of hinged brackets 21 which, in the present instance, are shown to be of U-shape conformation and are provided with openings which complement the bores of the bearings 15. The furcations of each hinge are adapted for engagement with the sides of each of the bearings 15. A tube 22 extends through each bearing and hinge and serves as an axis for the latter. The tube 22 at one side is adapted for the reception of a driven shaft 23, the latter having one end thereof enlarged to slidably receive one part 24 of a clutch head, the other part of the clutch head, designated 25, being carried by a stub shaft 26, which extends from a transmission housing 27. The transmission housing receives one end of a power shaft 28, which projects through the opening 16 of the frame 13 from the tractor. Consequently, in this manner power is transmitted from the tractor to the shaft 23, to rotate the latter when the clutch is in engagement, as shown in Fig. 4. The clutch may be disengaged at the option of the operator by means of a lever 29, in a manner well-known in the art. The outer end of the driven shaft 23 is equipped with sprocket wheels 30, three (3) of which are illustrated in the present instance, adapted to mesh with a standard type roller chain 31. It is of course, to be understood that this means of transmitting power is to illustrate the application of the invention only, and other means may be used without departing from the spirit and scope of the invention.

The rear terminals of the side sills 17 are detachably engaged with a supporting frame 32, which carries a tiller wheel 33. The frame 32 supports the free ends of the side sills in a predetermined plane above the ground to correspondingly maintain the pickers and macerators in the desired plane, with respect to the road of travel, at the same time allowing the sills to move on the hinges 21 when an inequality is encountered in the road of travel. The side sills 17 rotatably receive a macerating drum or roller, constructed in accordance with the present invention, generally designated 34. The macerating drum embodies a series of bars 35, each of which is equipped with a plurality of macerating teeth 36 extending along the longitudinal axis of the bar and detachably engaged therewith. The outer end of each tooth is curved in the direction of travel of the drum to provide a hook 37 for a purpose which will be hereinafter understood. The forward end of each bar 35 has the underface thereof cut-out, adapted for the reception of a knife blade 38, the cutting edge of which projects tangentially beyond the periphery of the drum, as illustrated to advantage in Fig. 2. The rear margin of each bar 35 is bent downwardly at right angles, as indicated at 39, to reinforce and strengthen the bar.

Mounted above the macerating drum or roller is a macerating housing 40, which is preferably of concavo-convex conformation. The ends of the housing 40 are offset and adapted for engagement between lugs 41, formed on the upper wall of each side sill 17. One terminal of each off-set end of the housing is thickened, as indicated at 42, and the outer face thereof inclined to correspond with the conformation of the sill lug with which it is engaged. The housing 40 is provided with a plurality of square, tapered openings 43, which are adapted to receive a complementally formed shank, formed on cutters 44, which are detachably engaged through said openings 43. The cutters 44 are secured from displacement by nuts 45. The lower ends of the cutters 44 are positioned to pass through the plane of the outer ends of the teeth 36 during rotation of the drum 35. However, the cutters 44 are arranged in alternate relation to the teeth 36, so that the teeth will, in effect, pass between the cutters during the rotation of the drum, to thereby effect a complete shredding or macerating of the materials carried up into the housing by the teeth of the drum.

The rear margin of the housing 40 is bent downwardly at right angles, to provide an abutment 40', against which unmacerated material will be impinged. The hooks 37 of the drum will then re-engage the unmacerated material until it is macerated.

It will be noted, especially upon reference to Fig. 2 of the drawings, that not only is the rear margin of the housing 40 provided with right angular abutment 40', but in addition, the ends of the housing are also equipped with right angle extensions to minimize possibility of material being displaced longitudinally of the housing and drum.

In order to gather the brush or prunings from the ground as they are compressed by the tractor, I provide picker arms 46, which are formed on a bar 47, the latter being suspended by links 48 which are pivotally mounted on the lower ends of the side sills 17. Each of the arms 46 is equipped with a shoe 49, which is so constructed and positioned in such a manner on the arm that it will slide on the surface of the ground. The shoes are pointed to find their way beneath the brush or prunings to facilitate disengagement of the same from the earth.

It is the intention of this invention that, as the tractor travels forwardly, the brush and prunings dislodged from the earth by the fingers 49, will be urged upwardly on the inclined arms 46 until they come within the zone of the teeth 36, at which time the brush and prunings will be intercepted and carried up into the macerating housing. Consequently, means has been provided to place the macerating drum in operative communication with the motive element of the tractor. The means employed in the present instance consists of sprocket wheels 50, mounted on one end of the drum shaft over which the sprocket chains 31 are trained. Consequently, movement transmitted to the sprocket chains will be communicated to the drum through the sprocket wheels 50, to thereby rotate the drum as the tractor moves forward. The sprocket wheels 30 and 50, and chains 31, are preferably encased, as indicated at 51. It is noted that as a substitute for using the tractor as means for actuating the drum, independent means can be adapted to perform that function.

The fingers 49 are normally held in engagement with the road of travel by a spring or other suitable means 52, one end of which is anchored on the plate 18 and the opposite end engaged with a lever 53, which is in engagement with the bar 47. The lever 53 may, however, be operated rearwardly against the resistance of the spring 52 in order to elevate the fingers from the ground, when desired by the operator. For this purpose a second lever 54 is provided, one end of which may be arranged in proximity to the operator's seat. An abutment 55 is arranged in the path of movement of the lever 54 to prevent the arms 46 from moving into engagement with the macerating drum. The extent of movement of the arms is indicated by the dotted lines in Fig. 2. As an additional safeguard, an abutment 56 is mounted on the frame 32, which limits the movement of the lever 53.

It is desired to so mount the macerating housing that it will yield under pressure to permit the passage of solid objects through the macerating mechanism without mutilating or distorting the latter in any way. Consequently, the macerating housing 40 is yieldingly mounted on the top of the side sills 17, in a manner heretofore-described. To retain the macerating housing in position, semi-eliptical springs 57 are provided, the ends of which are mounted in shackles 58, pivotally carried by the lugs 41 of the side sills. The intermediate parts of the springs 57 impinge against the off-set ends of the housing 40 to thereby hold the latter in position with respect to the side sills and drum and likewise to return the housing to its position after having been displaced by a foreign object passing through the macerator.

Preferably the front margin of the macerating housing is equipped with an apron 59, which projects downwardly to approximately a point parallel to a line drawn horizontally through the center of the macerating drum. The apron serves as a baffle against which the brush and prunings may be urged while being carried toward the macerating housing by the teeth of the macerating drum.

In use of this device, movement of the tractor correspondingly rotates the macerating drum in the manner already described. Consequently the brush depressed by the tractor is picked up by the fingers 49 and during movement of the tractor is caused to be urged upwardly on the arms and ultimately carried through the macerating housing. During this cycle of operation the brush, in addition to being subjected to the action of the teeth 36 and cutters 44, is likewise operated on by the blades 38 which effect a straight cut from one end of the housing to the other. By this action it has been found that the brush and prunings are shredded and cut into relatively small pieces, which are permitted to gravitate to the ground where they are mixed with the soil and used as fertilizer in a manner well-known in the art. Where a foreign object is to be encountered in the road of travel, especially an immobile object, such as a tree, root, or the like, the fingers 49 may be disengaged from the ground by operation of the lever 54 in a manner heretofore described. Furthermore, it sometimes happens that foreign objects, such as pipes, are picked up by the fingers and carried into the macerating mechanism. With the present invention it is apparent that the housing will flex in a manner already described to permit the pipe to pass therethrough without damage to the mechanism. Furthermore, it is of the essence of importance in the present invention to hingedly connect the picking and macerating unit of the present invention with the tractor so that inequalities encountered in the road of travel will not strain or in any way distort the connections. The hinge arrangement herein employed allows ample flexure and, furthermore, certain parts of the hinge serve as bearings for the driven shaft. It is manifest that with the device of the present invention the shredder and macerator may be operated by a simple movement of the lever 29, so as to engage the clutch and correspondingly the macerating drum may be rendered inoperative by disengaging the clutch.

It is, of course, to be understood that various changes may be made in this device, especially in the details of construction, proportion and arrangement of parts, as come within the scope of the appended claims.

What is claimed is:—

1. In a brush picking and macerating machine, a drum and juxtaposed housing equipped with cutting and shredding means, said housing being held in a yielding relation with the drum.

2. In combination, a track-laying tractor, and a brush picking and macerating unit, including a toothed drum, carried by and in operative connection with the tractor, the picker portion of said unit being disposed adjacent the lower runs of the tractor belts and having fingers whose advancing edges are disposed in the direction of travel of the tractor.

3. In combination, a track-laying tractor, and a brush picking and macerating unit carried by and in operative connection with the tractor, said unit embodying arms carried by the tractor and projecting downwardly therefrom, a finger carried by each arm, a macerating drum revolubly carried by the tractor, and a macerating housing mounted adjacent to said drum and cooperable therewith.

4. A picking and macerating machine, including a tractor and frame, a macerating drum mounted on the frame and in operative connection with the tractor, and a macerating housing adjacent the drum, for co-action with the latter, to macerate materials engaged by the drum, and means yieldingly engaging the housing with the tractor to permit the housing to flex when solid objects find their way between the drum and the housing.

5. A picking and macerating apparatus, including a tractor and frame, a housing mounted on the frame and equipped with cutters, a drum mounted on the frame and operated by the tractor, and teeth mounted on the drum, the free terminals of said teeth being formed to provide hooks adapted to pick up materials during operation of the drum, said hooks also carrying the materials to said cutters.

6. In a brush picker and macerator having a concave member equipped with inwardly projecting teeth, and a drum adapted to rotate adjacent to the concave side of the concave member, said drum having outwardly extending teeth thereon positioned and adapted to cooperate with the teeth in the concave member, said concave member being provided with an abutment at the rear end thereof adapted to catch unmacerated material which has passed along the path of travel of said drum to said abutment, said abutment being further adapted to hold such unmacerated material in position for engagement with the teeth of said drum until said material is macerated.

7. In a brush picker and macerator having a concave member equipped with inwardly projecting teeth, and a drum adapted to rotate adjacent to the concave side of the concave member, said drum having outwardly extending hooked teeth thereon positioned and adapted to cooperate with the teeth in the concave member, said concave member being provided with an abutment at the rear end thereof adapted to catch unmacerated material which has passed along the path of travel of said drum to said abutment, said abutment being further adapted to hold such unmacerated material in position for engagement with the hooked teeth of said drum and to cooperate with the hooked teeth to macerate said material.

8. In combination with a tractor, brush picking and macerating mechanism hingedly engaged with the tractor, and means operatively connecting said mechanism and tractor including a power shaft mounted in the hinge connection between the mechanism and tractor.

9. In combination with a tractor and brush picking and macerating mechanism; a hollow hinge for connecting said mechanism and tractor, and a power shaft mounted in said hinge for operatively connecting the tractor to said mechanism.

WILLIAM E. GOBLE.